(12) United States Patent
Johnson et al.

(10) Patent No.: US 8,973,636 B2
(45) Date of Patent: Mar. 10, 2015

(54) TIRE FOR HEAVY GOODS VEHICLE HAVING A REINFORCED BEAD

(75) Inventors: Philippe Johnson, Perignat-sur-Allier (FR); Bopha Grisin, Mozac (FR); Olivier Lenepveu, Clermont-Ferrand (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 220 days.

(21) Appl. No.: 13/387,954

(22) PCT Filed: Jul. 27, 2010

(86) PCT No.: PCT/EP2010/060860
§ 371 (c)(1),
(2), (4) Date: May 10, 2012

(87) PCT Pub. No.: WO2011/012605
PCT Pub. Date: Feb. 3, 2011

(65) Prior Publication Data
US 2012/0211140 A1 Aug. 23, 2012

Related U.S. Application Data

(60) Provisional application No. 61/255,410, filed on Oct. 27, 2009.

(30) Foreign Application Priority Data

Jul. 30, 2009 (FR) ...................................... 09 55330

(51) Int. Cl.
*B60C 15/00* (2006.01)
*B60C 15/06* (2006.01)
(52) U.S. Cl.
USPC ........... 152/539; 152/542; 152/546; 152/552; 152/554; 152/555

(58) Field of Classification Search
None
See application file for complete search history.

(56) References Cited

U.S. PATENT DOCUMENTS

| 6,802,351 | B1 | 10/2004 | Kimura et al. |
| 2001/0009171 | A1 | 7/2001 | Kato et al. |
| 2005/0109441 | A1 | 5/2005 | Sugiyama et al. |
| 2006/0027300 | A1 | 2/2006 | Maruoka |
| 2008/0190539 | A1* | 8/2008 | Ferlin et al. .................... 152/539 |

FOREIGN PATENT DOCUMENTS

| CN | 101137519 | 3/2008 |
| JP | 2001-191759 | 7/2001 |

(Continued)

*Primary Examiner* — Justin Fischer
(74) *Attorney, Agent, or Firm* — Cozen O'Connor

(57) ABSTRACT

Tire (10) for a heavy goods vehicle comprising a radial carcass reinforcement (60) anchored in each of the beads (50) to an anchoring structure (700), comprising a circumferential reinforcement (70), the carcass reinforcement (60) being partially wrapped around the anchoring structure (700), the tire (10) also comprising a coupling reinforcement (150) comprising a first part (151) in contact with the carcass reinforcement (60) and being extended by a second part (152) in contact with the anchoring structure (700) as far as a point (157) radially on the outside of the anchoring structure (700), located axially between the axially inner-most point (702) and the axially outermost point (704) of the anchoring structure (700), the tire (10) also comprising a stiffening reinforcement (160) surrounding the coupling reinforcement (150) and running radially on the inside of the anchoring structure (700) and of the coupling reinforcement (150), in which the axially outside end point (166) of said stiffening reinforcement (160) is located at a radial distance DR from the radially innermost point (73) of the circumferential reinforcement (70), the radial distance DR being greater than or equal to 0.8 times the radial distance DS between the radially innermost and radially outermost points (71, 73) of the circumferential reinforcement (70) and less than or equal to 1.2 times the radial distance DS.

10 Claims, 4 Drawing Sheets

(56) References Cited

FOREIGN PATENT DOCUMENTS

| JP | 2005-112134 | 4/2005 |
|---|---|---|
| JP | 2005-153731 | 6/2005 |
| JP | 2006-044576 | 2/2006 |
| JP | 2008-531398 | 8/2008 |
| WO | WO2008/107234 | 9/2008 |
| WO | WO 2008/107234 | 9/2008 |
| WO | WO 2009/051260 | 4/2009 |

* cited by examiner

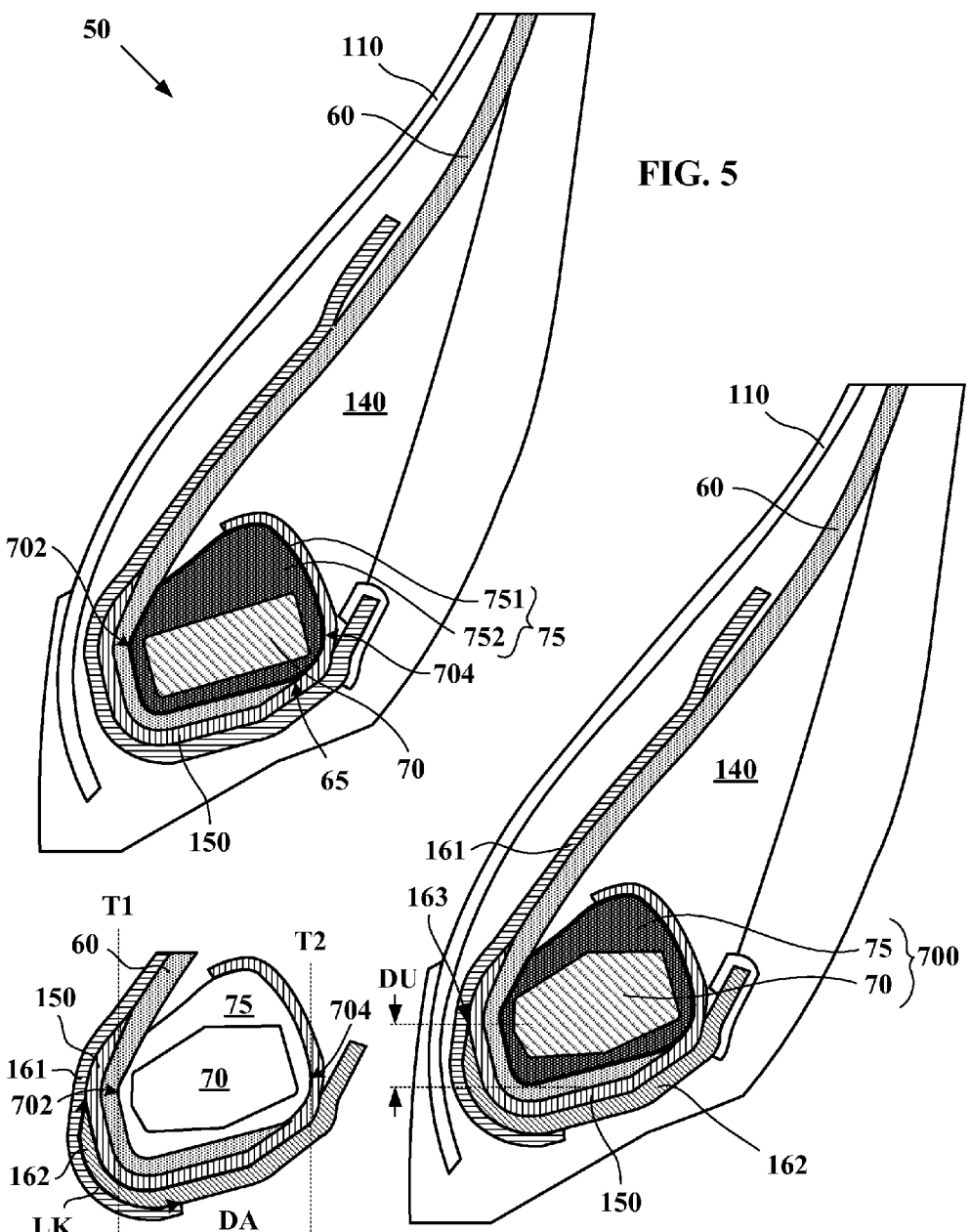

TIRE FOR HEAVY GOODS VEHICLE HAVING A REINFORCED BEAD

RELATED APPLICATIONS

This is a U.S. national stage of application No. PCT/EP2010/060860, filed on 27 Jul. 2010, which claims Priority to the French Application No.: 0955330, filed 30 Jul. 2009 and U.S. Application No. 61/255,410, filed Oct. 27, 2009 the contents of both are hereby incorporated herein by reference.

FIELD OF THE INVENTION

The present invention relates to tires having a radial carcass reinforcement and designed to be fitted to heavy goods vehicles. It relates even more particularly to the bead structure of these tires.

BACKGROUND

A heavy goods vehicle tire comprises a crown portion that is extended on each side by sidewalls ending in beads. Such a tire comprises a plurality of reinforcements including, in particular, a carcass reinforcement the role of which is to withstand the forces created by the internal inflation pressure of the tire. This carcass reinforcement is situated in the crown and sidewalls of the tire and is anchored at its ends to suitable anchoring structures located in the beads. The carcass reinforcement is generally composed of a plurality of reinforcing elements arranged parallel to one another and making an angle of close or equal to 90 degrees with the circumferential direction (in this case, the carcass reinforcement is said to be "radial"). The carcass reinforcement is usually anchored by being turned up around an anchoring structure having a suitable circumferential stiffness, in order to form axially on the outside a turn-up portion the length of which, measured for example with respect to the radially innermost point of the anchoring structure, is chosen to provide satisfactory endurance to the tire during use. Axially between the turn-up portion and the main portion of the carcass reinforcement there are one or more elastomer-based materials which provide mechanical coupling between the two portions of the carcass reinforcement.

In use, such a tire is mounted on a mounting rim comprising rim seats designed to be in contact with the radially innermost parts of the beads and, axially on the outside of each seat, a rim flange for fixing the axial position of said bead when the tire is mounted and inflated to its nominal pressure.

In order to make the tire withstand the mechanical stresses of rolling, it is known practice to provide additional bead reinforcements in particular in the form of plies arranged against at least part of the turn-up portion of the carcass reinforcement.

During rolling, the tire beads are subjected to a large number of bending cycles, as they wind around the rim flanges (i.e. they partly adopt the geometry of said flanges). This bending results in larger or smaller variations in curvature combined with variations in tension in the bead reinforcements and in particular in the turn-up portion of the carcass reinforcement. These same cycles induce compressive and extensile forces in the materials constituting the beads. During rolling, a cyclical circumferential displacement of the reinforcing elements of the reinforcement of the carcass reinforcement can also be seen in the sidewalls and the beads of the tire. A cyclical circumferential displacement is understood here to mean that displacement occurs in one direction and in the opposite direction with respect to a mean position of equilibrium each time the wheel rotates.

Rolling generates stresses and/or deformations in the materials constituting the bead, in particular the elastomers and more particularly those which are located in the immediate vicinity of the ends of the reinforcements (the end of the turn-up portion of the carcass reinforcement or the ends of the additional reinforcements). These stresses and/or deformations may lead to a more or less substantial reduction in the service life of the tire.

This is because these stresses and/or deformations may cause detachment and cracks near the ends of said reinforcements. Owing to the radial orientation of the reinforcing elements and to the nature of said reinforcing elements (in general, these are metal cables) of which it is made, the end of the turn-up portion of the carcass reinforcement is particularly sensitive to this phenomenon.

The document published under the reference WO 2006/013201-A1 describes a tire bead structure in which the carcass reinforcement is no longer turned up by being partially wrapped around a bead wire but is wound at least one complete revolution around an anchoring structure in each of the beads. In this manner, the end of the carcass reinforcement is located in an area of the bead which is not subjected to strong cyclical stresses; it is thus possible to increase the endurance of the beads.

However, while such a tire bead structure is effective from a mechanical point of view, it is nonetheless still expensive and difficult to implement using conventional industrial manufacturing means.

In a different approach, a means has been sought to prevent the risks of bead deterioration by proposing a bead structure having sufficient stiffness to withstand the bending forces and the circumferential movements of the reinforcements during rolling which is also easy to implement and economically attractive to produce on an industrial scale.

The document published under the reference WO 2008/107234-A1 describes such a bead structure. The document discloses a heavy goods vehicle tire comprising a tread extended transversely on each side by sidewalls ending in beads designed to engage with a mounting rim. In addition, this tire comprises a radial carcass reinforcement formed from a plurality of reinforcing elements directed in a direction that makes an angle of at least 80 degrees with the circumferential direction.

This carcass reinforcement is anchored in each of the beads to an anchoring structure comprising a circumferential reinforcement around which a coating profiled element is formed of which the perimeter of the radial section comprises a part radially on the inside and a part radially on the outside, these two parts meeting at the two axially furthest apart points of the perimeter of said coating profiled element.

Moreover, this carcass reinforcement is partially wrapped around the coating profiled element of the anchoring structure, proceeding from the inside of the tire to the outside, the end of this carcass reinforcement being located on or near the perimeter of the coating profiled element.

This tire also comprises a first connecting reinforcement formed from a plurality of reinforcing elements directed in a direction that makes an angle of greater than or equal to 70 degrees with the circumferential direction. This first connecting reinforcement comprises a first part in contact with the carcass reinforcement between (i) a point radially on the outside with respect to the perimeter of the coating profiled element of the radially outermost anchoring structure and (ii) the end point of the carcass reinforcement, this first connecting reinforcement being extended beyond the end of the carcass reinforcement by a second part in contact with the coating profiled element as far as a point located on the part radially on the outside of the perimeter of the coating profiled element.

This tire furthermore comprises a second connecting reinforcement surrounding the first connecting reinforcement and running radially under the coating profiled element radially on the inside of said first connecting reinforcement in order to form an internal portion and an external portion, the internal portion being located axially on the inside with respect to the carcass reinforcement and the external portion being located axially on the outside of said carcass reinforcement; the internal portion is in contact over a non-zero length with the carcass reinforcement between a first end point of the first portion and the end point of the first connecting reinforcement, the external portion being in contact with the carcass reinforcement from one point to an end point of the external portion over a non-zero length, these points being located radially outside the end points of the first connecting reinforcement.

This second connecting reinforcement is formed from a plurality of reinforcing elements directed in a mean direction that makes an angle of at most 50 degrees with the circumferential direction.

What distinguishes the architecture of this tire is, inter alia, the fact that the second connecting reinforcement is anchored around the bead anchoring structure while at the same time being coupled to the carcass reinforcement axially on each side of this reinforcement, in combination with the end of the carcass reinforcement being positioned in the vicinity of the anchoring structure. In such a structure, the end of the carcass reinforcement is kept in an area subjected to fairly low amounts of stress and deformation under running conditions and this end is moreover covered by at least the second reinforcement.

While such an architecture allows bead deterioration to be significantly reduced, there is still an area subject to a high concentration of crack-initiating stresses radially on the inside of the anchoring structure.

SUMMARY OF THE INVENTION

One object of the present invention is to further reduce the risks of bead deterioration.

This object is achieved by a bead structure the carcass reinforcement of which has no free end and which nevertheless has sufficient stiffness to withstand bending and deradialisation forces, this stiffness being brought about by additional reinforcing elements the ends of which, on the axially outer side of the tire, are located in areas of low deformation so as to reduce the concentrations of crack-initiating stresses.

More specifically, this object is achieved in accordance with one aspect of the present invention directed to a tire for a heavy goods vehicle, designed to be mounted on a rim, and comprising: a crown comprising a crown reinforcement surmounted by a tread; two sidewalls extending the crown radially inwards; two beads radially inside the sidewalls and designed to engage with the rim, each bead comprising an anchoring structure, the anchoring structure comprising a circumferential reinforcement, the anchoring structure having in any radial section a radially outermost point, an axially innermost point and an axially outermost point; and a radial carcass reinforcement comprising a plurality of reinforcing elements directed in a direction that makes an angle of at least 80 degrees with the circumferential direction, the carcass reinforcement being anchored in each of the beads to the anchoring structure, the carcass reinforcement being partially wrapped around the anchoring structure, passing axially from the inside to the outside of the tire, the end point of this carcass reinforcement being located on or near the anchoring structure and axially between the axially innermost point and the axially outermost point of the anchoring structure.

The tire also comprises a coupling reinforcement formed from a plurality of reinforcing elements directed in a direction that makes an angle of greater than or equal to 70 degrees with the circumferential direction, comprising a first part in contact with the carcass reinforcement between an end point which is radially on the outside with respect to the radially outermost point of the anchoring structure and the end point of the carcass reinforcement, the coupling reinforcement being extended beyond the end point of the carcass reinforcement by a second part in contact with the anchoring structure and as far as an end point radially on the outside of the anchoring structure, the end point of the coupling reinforcement being located axially between the axially innermost point and the axially outermost point of the anchoring structure.

The tire also comprises a stiffening reinforcement surrounding the coupling reinforcement and running radially on the inside of the anchoring structure and of the coupling reinforcement so as to form an axially internal portion and an axially external portion, the axially internal portion being axially on the inside with respect to the carcass reinforcement and the axially external portion being axially on the outside of said carcass reinforcement, the axially internal portion being in contact over a length LC with the carcass reinforcement between the end point of said axially internal portion and the end point of the coupling reinforcement, the end point being located radially on the outside of the end point of the coupling reinforcement, this stiffening reinforcement being formed from a plurality of reinforcing elements directed in a mean direction that makes an angle of less than or equal to 50 degrees with the circumferential direction.

The axially outside end point of said stiffening reinforcement is located at a radial distance DR from the radially innermost point of the circumferential reinforcement of the anchoring structure, the radial distance DR being greater than or equal to 0.8 times the radial distance DS between the radially innermost and radially outermost points of the circumferential reinforcement of the anchoring structure and less than or equal to 1.2 times the radial distance DS between the radially innermost and radially outermost points of the circumferential reinforcement of the anchoring structure.

By virtue of this location of the end of the stiffening reinforcement, the stresses to which the end of the stiffening reinforcement is subjected are limited and the formation of cracks is very significantly slowed down.

Excellent results have in particular been obtained with a stiffening reinforcement formed from a plurality of reinforcing elements directed in a mean direction that makes an angle of greater than or equal to 15 degrees and less than or equal to 30 degrees with the circumferential direction.

According to an advantageous embodiment, the anchoring structure comprises a coating profiled element surrounding the circumferential reinforcement and the perimeter of the radial section of the coating profiled element comprises a part radially on the inside and a part radially on the outside, said parts meeting at the axially innermost and axially outermost points of the anchoring structure. The end point of the carcass reinforcement is located on or near the perimeter of the coating profiled element. The existence of such a coating profiled element enhances the adhesion between the anchoring structure and the carcass reinforcement, on the one hand, and the coupling reinforcement, on the other.

According to an advantageous embodiment, the contact length LC of the axially internal portion of the stiffening reinforcement is at least 20 percent of the distance DY between the radially outermost end point of the axially internal portion of the stiffening reinforcement and the radially innermost point of the circumferential reinforcement of the anchoring structure. The contact length LC is thus sufficient for the stiffening reinforcement to effectively oppose deradialisation movements of the carcass reinforcement during rolling movements which can generate bead wear of the tire on the wheel.

Preferably, the distance DY between the radially outermost end point of the axially internal portion of the stiffening reinforcement and the radially innermost point of the circumferential reinforcement of the anchoring structure is greater than or equal to 15 percent and less than or equal to 40 percent of the radial distance DC between the radially outermost point of the carcass reinforcement and the radially innermost point of the same carcass reinforcement. The radially outermost end point of the axially internal portion of the stiffening reinforcement is thus sufficiently far from the areas of the bead and the sidewall which are subject to substantial bending during rolling, and as a result the formation of cracks is prevented.

According to an advantageous embodiment, the reinforcing elements of the coupling reinforcement are chosen from reinforcing elements of a textile nature, which greatly facilitates its wrapping around the anchoring structure.

It is advantageous to locally separate the axially internal portion of the stiffening reinforcement from the carcass reinforcement so as to reduce the shear stresses near the end point of said axially internal point, an elastomer being interposed between said reinforcements.

Advantageously, the stiffening reinforcement is formed from two discontinuous parts each constituting one of the portions, these discontinuous parts overlapping in a superposition area.

When the stiffening reinforcement is formed from two discontinuous parts each constituting one of the portions, and these discontinuous parts overlap in a superposition area, it is advantageous to ensure that the superposition area is located in the vicinity of the coating profiled element of the anchoring structure and that the length LK of the superposition area is at least half the axial distance DA between the axially furthest apart points of the anchoring structure.

According to a particular embodiment, the coupling reinforcement is interposed between the coating profiled element of the bead anchoring structure and the carcass reinforcement.

BRIEF DESCRIPTION OF THE DRAWINGS

FIGS. 5, 6 and 8 show diagrammatically and in radial section various tire beads according to an embodiment of the invention.

FIG. 7 shows a detail of FIG. 6.

DETAILED DESCRIPTION OF THE DRAWINGS

It is important to distinguish between several different uses of the term "radial" by persons skilled in the art. Firstly, the expression refers to a radius of the tire. It is within this meaning that a point P1 is referred to as being "radially inside" a point P2 (or "radially on the inside of" the point P2) if it is nearer to the axis of rotation of the tire than the point P2. Conversely, a point P3 is referred to as being "radially outside" a point P4 (or "radially on the outside of" the point P4) if it is further from the axis of rotation of the tire than the point P4. Progress in the direction of smaller (or larger) radii is referred to as progress "radially inwards (or outwards)". This meaning of the term also applies to radial distances.

By contrast, a thread or a reinforcement is said to be "radial" when the thread or the reinforcing elements of the reinforcement make an angle of greater than or equal to 80° and less than or equal to 90° with the circumferential direction. It should be specified that in the present document the term "thread" should be understood very broadly and includes threads in the form of monofilaments, multifilaments, a cable or cord, a folded yarn or an equivalent assembly, no matter what material the thread is made of or the surface treatment performed to promote its adhesion to the rubber.

Finally, the expression "radial section" is understood here to be a section on a plane which includes the axis of rotation of the tire.

An "axial" direction is a direction parallel to the axis of rotation of the tire. A point P5 is referred to as "axially inside" a point P6 (or "axially on the inside of" the point P6) if it is nearer the mid-plane of the tire than the point P6. Conversely, a point P7 is referred to as being "axially outside" a point P8 (or "axially on the outside of" the point P8) if it is further from the mid-plane of the tire than the point P8. The "mid-plane" of the tire is the plane perpendicular to the axis of rotation of the tire and located equidistant from the circumferential reinforcements of each bead.

A "circumferential" direction is a direction perpendicular both to a radius of the tire and to the axial direction. A "circumferential section" is a section on a plane perpendicular to the axis of rotation of the tire.

"Rolling surface" is understood here to mean all the points of the tread of a tire that are likely to come into contact with the ground when the tire is rolling.

The expression "rubber mix" denotes a rubber composition comprising at least an elastomer and a filler.

In order to facilitate reading of the description of the embodiments shown in the figures, the same references are used to denote elements having identical structures.

Figure 1:
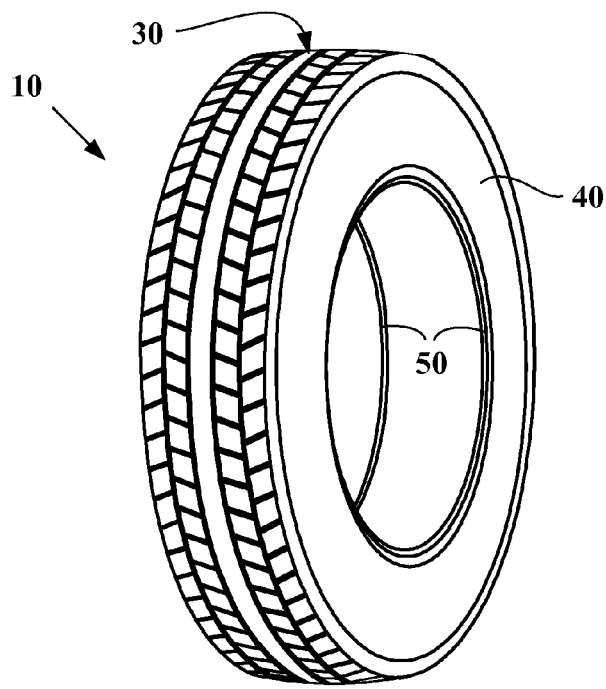
FIGS. 1 and 2 show diagrammatically a tire according to the prior art.

FIG. 1 shows diagrammatically a tire 10 according to the prior art. The tire 10 comprises a crown comprising a crown reinforcement (not visible in FIG. 1) surmounted by a tread 30, two sidewalls 40 extending the crown radially inwards, and two beads 50 radially inside the sidewalls 40.

Figure 2:
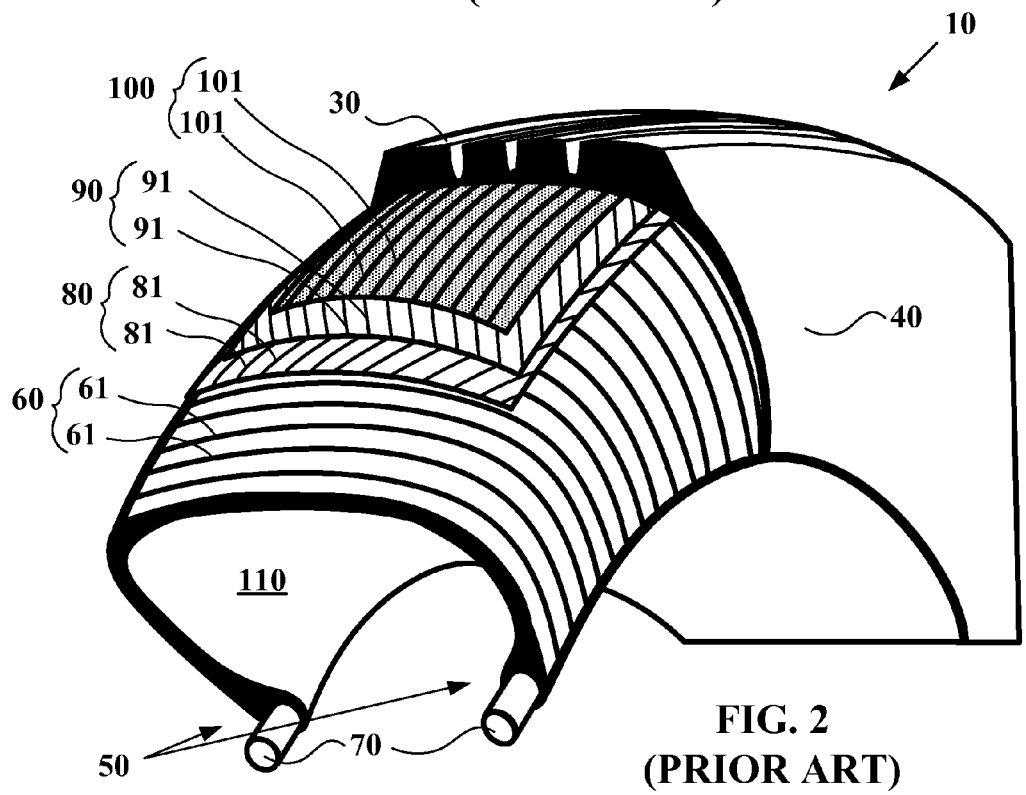

FIG. 2 shows diagrammatically a partial perspective view of another tire 10 according to the prior art and illustrates the various components of the tire. The tire 10 comprises a carcass reinforcement 60 consisting of threads 61 coated with a rubber mix, and two beads 50 each comprising circumferential reinforcements 70 (in this case bead wires) which keep the tire 10 on the rim (not shown). The carcass reinforcement 60 is anchored in each of the beads 50. The tire 10 also comprises a crown reinforcement comprising two plies 80 and 90. Each of the plies 80 and 90 is reinforced by filamentary reinforcing elements 81 and 91 which are parallel in each layer and crossed from one layer to the next, making angles of between 10° and 70° with the circumferential direction. The tire also comprises a hooping reinforcement 100 arranged radially on the outside of the crown reinforcement, this hooping reinforcement being formed from reinforcing elements 101 directed circumferentially and wound in a spiral. A tread 30 is placed on the hooping reinforcement; it is by means of this tread 30 that the tire 10 makes contact with the road. The tire 10 shown is a "tubeless" tire: it comprises an "inner liner" 110 made of a rubber composition impermeable to the inflation gas and covering the inner surface of the tire.

Figures 3, 4:
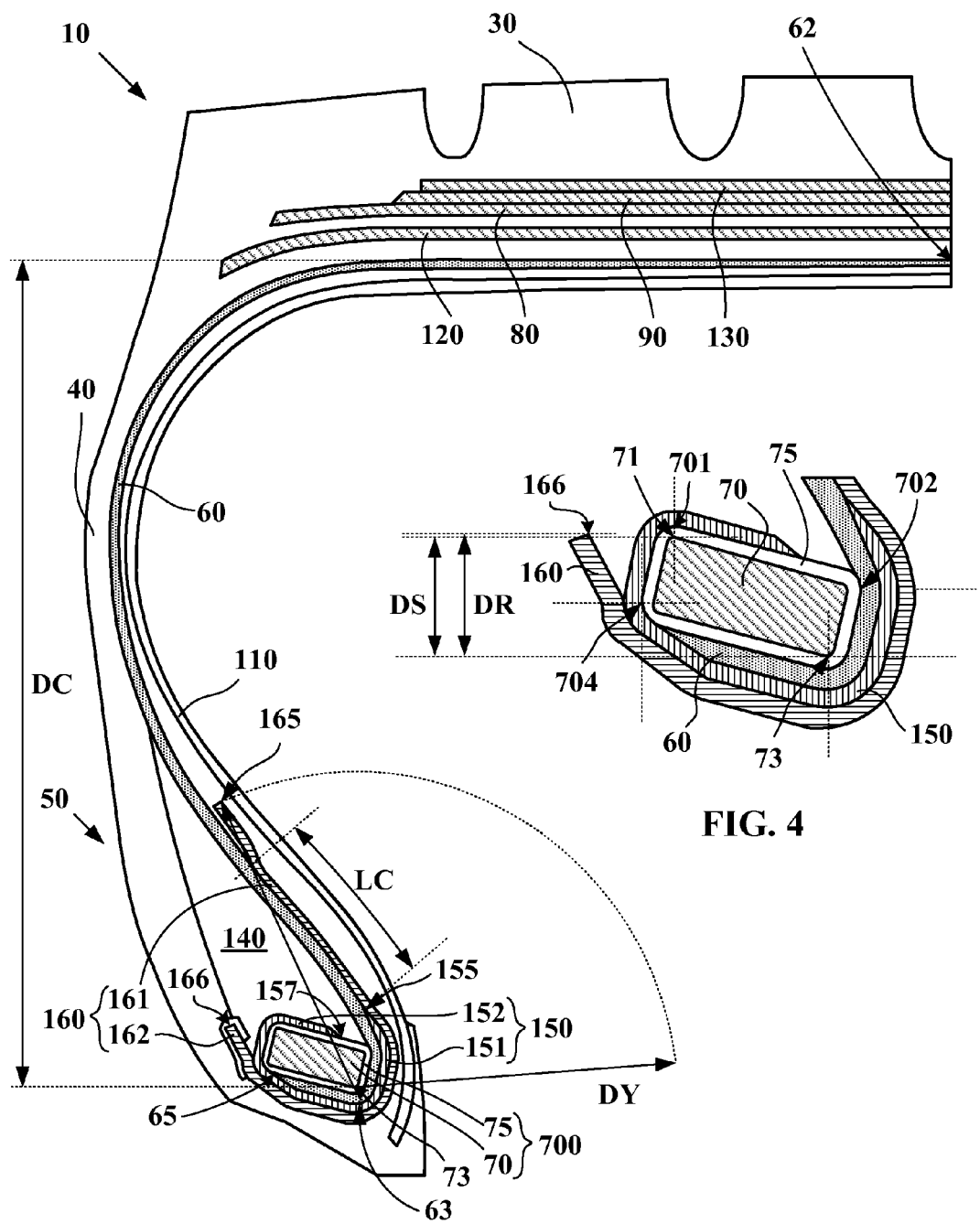
FIG. 3 shows diagrammatically and in radial section part of a tire according to an embodiment of the invention.
FIG. 4 shows a detail of FIG. 3.

FIG. 3 shows diagrammatically and in radial section part of a tire 10 according to an embodiment of the invention, of size 295/60R22.5. It is a heavy goods vehicle tire designed to be mounted on a rim (not shown). The tire 10 comprises a crown comprising a crown reinforcement, formed by plies 80 and 90, sandwiched between reinforcing plies 120 and 130. The reinforcing ply 120 protects the carcass reinforcement 60 from compression and the reinforcing ply 130 protects the crown reinforcement from punctures and impacts. The latter ply is surmounted by a tread 30.

The tire 10 also comprises two sidewalls 40 extending the crown radially inwards and two beads 50 radially inside the sidewalls and designed to engage with the rim. Each bead comprises an anchoring structure 700, the anchoring structure comprising a circumferential reinforcement 70. In the present case, the reinforcement 70 is a bead wire composed of a plurality of circumferentially wound metallic wires. As shown in FIG. 4, the anchoring structure 700 has in any radial section a radially outermost point 701, an axially innermost point 702 and an axially outermost point 704. The radially innermost point 73 and the radially outermost point 71 of the circumferential reinforcement 70 are also indicated. If the geometry of the anchoring structure 700 is such that a plurality of points qualify as axially/radially innermost/outermost, any one of these points can be selected. The anchoring structure also comprises a coating profiled element 75, in this case a nylon 140/2 fabric. The nylon cords of the coating profiled element 75 are coated with rubber mix having a modulus of elasticity at 10 percent elongation (at 20° C.) of greater than 5 MPa. The cords are spaced 1 mm apart and directed in a direction that makes an angle of greater than or equal to 50 degrees with the circumferential direction.

The tire 10 also comprises a radial carcass reinforcement 60 comprising a plurality of metal cables formed from a number of elemental threads measuring 18/100 mm. These cables are embedded in a rubber mix and directed in a direction that makes an angle of greater than or equal to 80 degrees with the circumferential direction. The carcass reinforcement 60 is anchored in each of the beads to the anchoring structure 700: specifically, the carcass reinforcement 60 is partially wrapped around the anchoring structure 700, passing axially from the inside to the outside of the tire. The carcass reinforcement 60 thus follows the profile of part of the perimeter of the coating profiled element 75 and is mechanically coupled to this coating profiled element by adhesion of the material of which the coating profiled element is composed and the material coating the reinforcing elements of the carcass reinforcement 60. The end point 65 of this carcass reinforcement 60 is located on or near the anchoring structure 700 and axially between the axially innermost point 702 and the axially outermost point 704 of the anchoring structure. When the end point 65 of the carcass reinforcement is said to be located "near" the anchoring structure 700, this should be understood as meaning that the minimum distance between the end point 65 and the anchoring structure 700 is less than or equal to 4 mm.

Moreover, an apex 140 made of rubber mix is provided in the bead. The material of this profiled element is preferably chosen such that it has a modulus of elasticity at 10 percent elongation (at 20° C.) of between 2 and 5 MPa (in this case 4 MPa).

The tire 10 also comprises a coupling reinforcement 150 formed from a plurality of cords made of aramid 160×3 directed in a direction that makes an angle of greater than or equal to 70 degrees with the circumferential direction. The aramid cords of the coupling reinforcement 150 are coated in rubber mix having a modulus of elasticity at 10 percent elongation (at 20° C.) of greater than 5 MPa. The cords are spaced 1.25 mm apart. This coupling reinforcement 150 comprises a first part 151 and a second part 152. The first part 151 consists of the part of the coupling reinforcement 150 in contact with the carcass reinforcement. This first part 151 extends between an end point 155 radially on the outside with respect to the radially outermost point 701 of the anchoring structure 700 (see FIG. 4) and the end point 65 of the carcass reinforcement 60. The coupling reinforcement 150 is extended beyond the end point 65 of the carcass reinforcement 60 by a second part 152 which is in contact with the anchoring structure 700 as far as an end point 157 radially on the outside of the anchoring structure 700. The end point 157 of the coupling reinforcement 150 is located axially between the axially innermost point 702 and the axially outermost point 704 of the anchoring structure 700. The boundary between the first part 151 and the second part 152 of the coupling reinforcement is considered to be located at the axial position of the end point 65 of the carcass reinforcement 60.

Finally, the tire 10 comprises a stiffening reinforcement 160 surrounding the coupling reinforcement 150 and running radially on the inside of the anchoring structure 700 and of the coupling reinforcement 150 so as to form an axially internal portion 161 and an axially external portion 162. The axially internal portion 161 is the portion of the stiffening reinforcement 160 axially on the inside with the respect to the carcass reinforcement 60, and the axially external portion 162 is the portion of the stiffening reinforcement 160 axially on the outside of the carcass reinforcement 60. The boundary between the axially internal portion 161 and the axially external portion 162 is considered to be located at the axial position of the radially innermost point 63 of the carcass reinforcement 60. When the carcass reinforcement 60 comprises a number of radially innermost points, any one of these points can be selected. The axially internal portion 161 is in contact over a length LC with the carcass reinforcement 60, between the end point 165 of said axially internal portion 161 and the end point 155 of the coupling reinforcement 150, the end point 165 being located radially on the outside of the end point 155 of the coupling reinforcement 150. It should be noted, moreover, that near the end point 165 of the axially internal portion 161, the latter is locally separated from the carcass reinforcement so as to reduce the shear stresses in this area, some of the rubber mix being interposed between the reinforcements.

The stiffening reinforcement 160 is in this case formed from a plurality of 6×35 steel cables, spaced 2.5 mm apart. The minimum spacing for 6×35 cables is 2 mm, but if 19×18 steel cables were used, the minimum spacing would be 1.4 mm. The cables are directed in a mean direction that makes an angle of less than or equal to 50 degrees, and preferably an angle of greater than or equal to 15 degrees and less than or equal to 30 degrees, with the circumferential direction. The choice of angles has in particular the effect of facilitating the manufacture and turning up of the reinforcement around the reinforcement 70. It also has the effect of significantly reducing the deradialisation of the carcass reinforcement.

As shown in FIG. 4, the axially outside end point 166 of the stiffening reinforcement 160 is located at a radial distance DR from the radially innermost point 73 of the circumferential reinforcement 70 of the anchoring structure 700. In a tire according to an embodiment of the invention, the radial distance DR is greater than or equal to 0.8 times the radial distance DS between the radially innermost point 73 and the radially outermost point 71 of the circumferential reinforcement 70 of the anchoring structure 700 and less than or equal to 1.2 times the radial distance DS between the radially innermost point 73 and the radially outermost point 71 of the circumferential reinforcement 70 of the anchoring structure 700. In this case, DR=11 mm, DS=10.5 mm and DR/DS=1.05.

The contact length LC (in this case 28 mm) of the axially internal portion 161 of the stiffening reinforcement 160 is in this case equal to 50 percent of the distance DY (in this case 55 mm) between the radially outermost end point 165 of the axially internal portion of the stiffening reinforcement 160 and the radially innermost point 73 of the circumferential reinforcement 70 of the anchoring structure 700.

The distance DY is furthermore equal to 39 percent of the radial distance DC between the radially outermost point 62 of the carcass reinforcement 60 and the radially innermost point 63 of the same carcass reinforcement (in this case DC=140 mm).

In FIG. 3, the end of the stiffening reinforcement 160 is covered with a "rubber edging" 166. This rubber edging 166 protects the rubber mixes surrounding the end of the stiffening reinforcement 160 from being damaged by indentation of the cables of this stiffening reinforcement 160 during rolling, this damage being associated with the movements of the ends of the cables. The rubber edging 166 is composed of a rubber mix resistant to cutting; its modulus of elasticity at 10 percent elongation (at 20° C.) is preferably greater than 5 MPa.

FIG. 5 shows diagrammatically and in radial section a variant of a tire bead according to an embodiment of the invention. In contrast to the bead of the tire 10 in FIG. 3, the coating profiled element 75 comprises both a retention reinforcement 751 and a rubber padding 752 made of rubber mix and surrounding the circumferential reinforcement 70. The retention reinforcement 751 may be produced from a stiff rubber mix (having a modulus of elasticity at 10 percent and 20° C. of greater than 10 MPa) or of a composite, comprising aramid or nylon textile reinforcing elements and rubber mix, e.g. rubber mix of the same type as the rubber mix embedding the reinforcing elements of the coupling reinforcement. In each radial section, the perimeter of the coating profiled element 75 comprises a part radially on the inside and a part radially on the outside, said parts meeting at the axially innermost and axially outermost points 702, 704 of the anchoring structure. Again, the end point 65 of the carcass reinforcement is located on or near the perimeter of the coating profiled element 75.

FIG. 6 shows diagrammatically and in radial section another variant of a tire bead according to an embodiment of the invention. In this case, the stiffening reinforcement 160 is formed from two discontinuous parts 161 and 162, these discontinuous parts overlapping in a superposition area. This superposition area is located in the vicinity of the coating profiled element of the anchoring structure, which means that the distance DU between the axially inner end 163 of the axially outer strand 162 of the stiffening reinforcement 160 and the radially innermost point of the anchoring structure 700 is less than 1.5 DR (see FIG. 3).

In any radial section, the length LK (indicated by means of a double-headed arrow in FIG. 7) of the superposition area, defined as the curvilinear length of the path of the interface between the two discontinuous parts 161 and 162, is at least half the axial distance DA (see FIG. 7) between the axially furthest apart points 702 and 704 of the anchoring structure 700. These points 702 and 704 are obtained by constructing tangents T1 and T2 to the anchoring structure 700, said tangents being perpendicular to the axis of rotation of the tire. In this case LK=15 mm and DA=19 mm.

This variant is advantageous because it allows the materials of the two discontinuous parts 161 and 162 to be differentiated, either by employing reinforcing elements of differing kinds (for example textile reinforcing elements for one part and metal reinforcing elements for the other) or by employing differing coating materials, or a combination of the two. It also allows to improve manufacturing as there is greater precision in the position of the components and reinforcements and a reduction in the space taken up at manufacturing stations.

Figure 8:
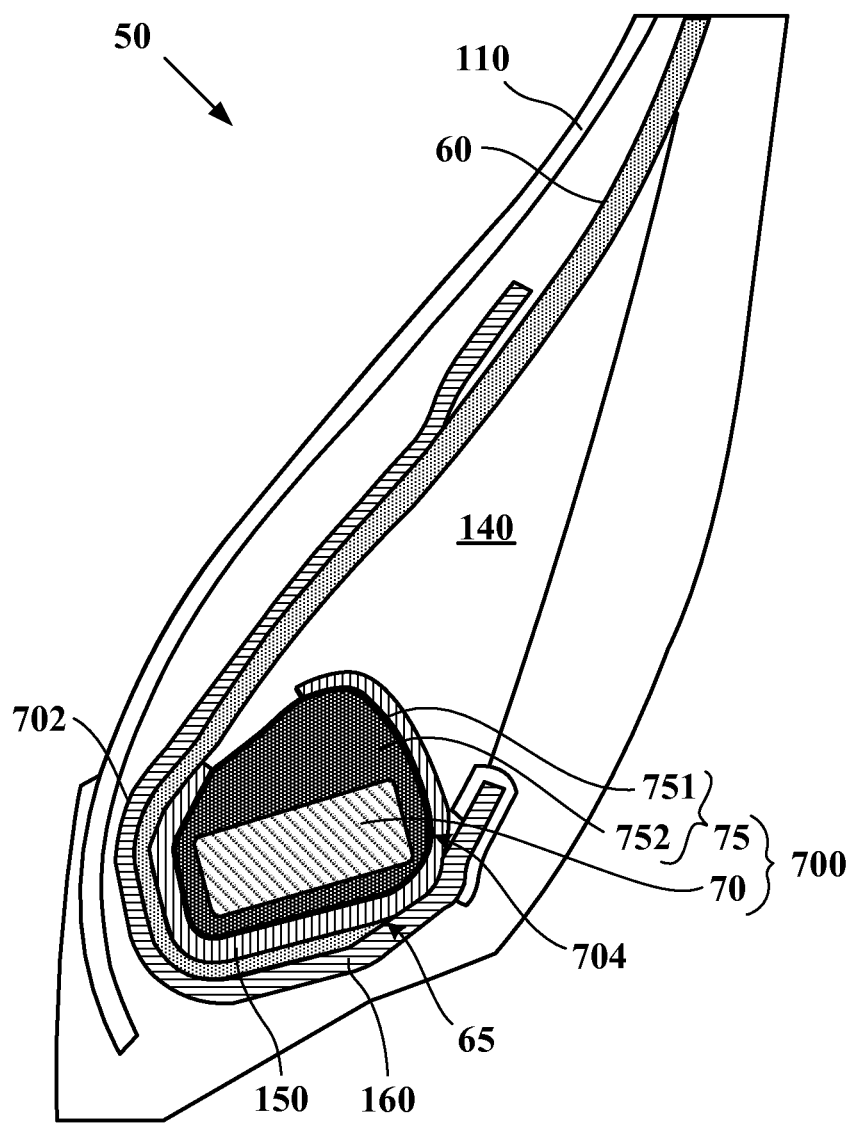

FIG. 8 shows diagrammatically and in radial section another variant of a tire bead according to an embodiment of the invention. In this case, the coupling reinforcement 150 is interposed between the coating profiled element 75 of the bead anchoring structure 700 and the carcass reinforcement 60. The end 65 of the carcass reinforcement 60 is thus positioned between the coupling reinforcement 150 and the stiffening reinforcement 160. This arrangement ensures better mechanical integrity of the carcass reinforcement in each bead and prevents the reinforcing elements of this reinforcement from coming into contact with the circumferential reinforcement 70 while the tire is in use.

In a heavy goods vehicle tire of size 295/60 R 22.5, the novel geometry of the bead substantially improved the endurance of the bead. During an endurance test in which the tire rolls on a machine while being subjected to a high load (about 50% higher than the nominal load for that size), the service life was increased by more than 60% with respect to the tires of the document WO 2008/107234-A1.

The invention claimed is:

1. A tire for a heavy goods vehicle, configured to be mounted on a rim, and comprising:
   a crown comprising a crown reinforcement surmounted by a tread;
   two sidewalls extending said crown radially inwards;
   two beads radially inside said two sidewalls and configured to engage with the rim, each of said two beads comprising an anchoring structure, said anchoring structure comprising a circumferential reinforcement, said anchoring structure having in any radial section an axially innermost point and an axially outermost point;
   a radial carcass reinforcement comprising a plurality of reinforcing elements directed in a direction that makes an angle of greater than or equal to 80 degrees with a circumferential direction, the carcass reinforcement being anchored in each of the beads to the anchoring structure, said radial carcass reinforcement being partially wrapped around said anchoring structure, passing axially from the inside to the outside of the tire, an end point of this carcass reinforcement being located on or near said anchoring structure and axially between said axially innermost point and said axially outermost point of said anchoring structure;
   a coupling reinforcement formed from a plurality of reinforcing elements directed in a direction that forms an angle of greater than or equal to 70 degrees with said circumferential direction, comprising a first part in contact with said carcass reinforcement between one end point of said coupling reinforcement that is radially on the outside with respect to said radially outermost point of said anchoring structure and said end point of said carcass reinforcement, said coupling reinforcement being extended beyond said end point of said carcass reinforcement by a second part in contact with said anchoring structure as far as another end point of said coupling reinforcement that is radially on the outside of said anchoring structure, said another end point of said coupling reinforcement being located axially between said axially innermost point and said axially outermost point of said anchoring structure; and a stiffening reinforcement surrounding said coupling reinforcement and extending radially on the inside of said anchoring structure and of said coupling reinforcement so as to form an axially internal portion and an axially external portion, said axially internal portion being axially on the inside with respect to said carcass reinforcement and said axially external portion being axially on the outside of said carcass reinforcement, said axially internal portion being in contact over a length LC with said carcass reinforcement between an end point of said axially internal portion and said one end point of said first part of the coupling reinforcement opposite the second part, said end point of said axially internal portion being located radially on the outside of said one end point of said coupling reinforcement, said stiffening reinforcement being formed from a plurality of reinforcing elements directed in a mean direction that makes an angle of less than or equal to 50 degrees with said circumferential direction, wherein an axially outside end point of said stiffening reinforcement is located at a radial distance DR from a radially innermost point of said circumferential reinforcement of said anchoring structure, said radial distance DR being greater than or equal to 0.8 times a radial distance DS between said radially innermost point and a radially outermost point of said circumferential reinforcement of said anchoring structure and less than or equal to 1.2 times said radial distance DS between said radially innermost point and said radially outermost point of said circumferential reinforcement of said anchoring structure, and wherein the first part of the coupling reinforcement is arranged between the stiffening reinforcement and the carcass reinforcement.

2. The tire of claim 1, wherein said stiffening reinforcement is formed of a plurality of reinforcing elements directed in a mean direction that makes an angle of greater than or equal to 15 degrees and less than or equal to 30 degrees with said circumferential direction.

3. The tire of claim 1, wherein said anchoring structure comprises a coating profiled element surrounding said circumferential reinforcement, wherein the perimeter of the radial section of said coating profiled element comprises a part radially on the inside and a part radially on the outside, said parts meeting at said axially innermost and axially outermost points of said anchoring structure, and wherein said end point of said carcass reinforcement is located on or near the perimeter of said coating profiled element.

4. The tire of claim 3, wherein said stiffening reinforcement is formed from two discontinuous parts each constituting one of said axially internal and axially external portions of said stiffening reinforcement, said two discontinuous parts overlapping in a superposition area, wherein said axially internal and axially external portions of said stiffening reinforcement superposition area is located in the vicinity of said coating profiled element of said anchoring structure and wherein in any radial section a length LK of said superposition area is at least half an axial distance DA between said axially innermost and axially outermost points of said anchoring structure.

5. The tire of claim 3, wherein said coupling reinforcement is interposed between said coating profiled element of said anchoring structure and said carcass reinforcement.

6. The tire of claim 1, wherein said contact length LC of said axially internal portion of said stiffening reinforcement is at least 20 per cent of a distance DY between said radially outermost end point of said axially internal portion of said stiffening reinforcement and said radially innermost point of said circumferential reinforcement of said anchoring structure.

7. Tire of claim 6, wherein said distance DY between said radially outermost end point of said axially internal portion of said stiffening reinforcement and said radially innermost point of said circumferential reinforcement of said anchoring structure is greater than or equal to 15 per cent and less than or equal to 40 per cent of said radial distance DC between said radially outermost point of said carcass reinforcement and said radially innermost point of said carcass reinforcement.

8. The tire of claim 1, wherein the reinforcing elements of said coupling reinforcement are chosen from reinforcing elements of a textile nature.

9. The tire of claim 1, wherein said axially internal portion of said stiffening reinforcement is locally separated from said carcass reinforcement so as to reduce the shear stresses near said end point of said axially internal point, an elastomer being interposed between said reinforcements.

10. The tire of claim 1, wherein said stiffening reinforcement is formed from two discontinuous parts each constituting one of said axially internal and axially external portions of said stiffening reinforcement, said discontinuous parts overlapping in a superposition area.

* * * * *